United States Patent
Gray

(10) Patent No.: US 6,237,078 B1
(45) Date of Patent: May 22, 2001

(54) CODE SEGMENT DEFAULT OPERATION DETERMINATION

(75) Inventor: Christopher Gray, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/137,731

(22) Filed: Aug. 21, 1998

(51) Int. Cl.[7] ................................................ G06F 15/76
(52) U.S. Cl. .............................................. 712/32; 712/241
(58) Field of Search ........................... 712/241, 32, 229, 712/207, 226, 210

(56) References Cited

U.S. PATENT DOCUMENTS

| | | | | |
|---|---|---|---|---|
| 4,714,994 | * | 12/1987 | Oklobdzija et al. | 712/207 |
| 5,117,488 | * | 5/1992 | Noguchi et al. | 712/210 |
| 5,303,355 | * | 4/1994 | Gergen et al. | 712/241 |
| 5,644,755 | * | 7/1997 | Wooten | 703/23 |
| 5,832,299 | * | 11/1998 | Wooten | 712/229 |
| 5,867,726 | * | 1/1999 | Ohsuga et al. | 712/32 |

* cited by examiner

Primary Examiner—Ly V. Hua
(74) Attorney, Agent, or Firm—Conley, Rose & Tayon, PC; Robert C. Kowert

(57) ABSTRACT

A method for determining the default operating mode of a code segment by determining whether an instruction modifies bits in both the upper-order and lower-order halves of a register. A register is set to a known value and an instruction which operates on the register is subsequently executed. After execution of the instruction, it is determined whether the high-order bits of the register have been modified by the instruction. If the instruction modifies the high-order bits of the register, a first default mode is indicated and, if the instruction does not modify the high-order bits of the register, a second default mode is indicated.

26 Claims, 2 Drawing Sheets

CODE SEGMENT DEFAULT OPERATION DETERMINATION

BACKGROUND OF THE INVENTION

1. Field of the Invention

The invention relates generally to programming microprocessors and more particularly to a method for determining the default size of operations in a code segment using instructions which are available to multiple privilege levels in multiple operating modes.

2. Description of the Relevant Art

One of the functions of an operating system in a computer is to provide a simplified environment in which a software application can be executed. In the x86 architecture, the memory management function of the operating system creates separate logical address spaces for each of the applications executing on the system. By doing so, the memory management mechanism eliminates the need for each of the applications to individually check its memory references in order to avoid using memory locations used by other applications. The applications are thus allowed to execute without interference from each other.

The x86 architecture implements separation of the address spaces for the respective programs using a memory model referred to as segmentation. Segmentation provides each of the applications with an address space having several separate, protected segments. The segments appear to the application to be contiguous so that there is no need for the programmer to write position-dependent code. Memory references to the individual segments may only refer to data in those segments so that, for example, a stack cannot grow into the code or data of an application. The limits of the segments are enforced by hardware in the computer system. (Particular segments can, however, be shared by more than one application.) Memory addresses which appear to an application to be fixed are referenced by the operating system as offsets from the beginning of one of the segments.

Referring to FIG. 1, a block diagram of a typical memory management model for a system having an x86 architecture is shown. The fixed, logical address used by an application is translated by the segmentation mechanism into a linear address. If the computer system does not have a paging mechanism, the linear address is also the physical address of the memory location. The paging mechanism swaps "pages" of memory between the memory and the system's hard disk or other persistent storage devices to simulate an address space which is larger than the available memory. If a paging mechanism is implemented, this mechanism translates the linear address into a physical address.

The operating system's memory management mechanism keeps track of the various segments by using segment descriptors. Segment descriptors contain data defining the size and location of the segments, as well as control and status information. The segment descriptors are stored in an array called the segment descriptor table. There are actually two types of segment descriptor table: the global descriptor table (GDT); and local descriptor tables (LDT). The GDT contains segment descriptors for all tasks (applications being executed.) There is an LDT for each task which includes descriptors for only that task. A descriptor table can have a variable length and, in the x86 architecture, may contain up to 8192 ($2^{13}$) segment descriptors. The first entry in the GDT is a null descriptor which may be used to initialize segment registers. A memory reference to the null descriptor will generate an exception.

Referring to FIG. 2, a diagram illustrating the components of a segment descriptor is shown. Each segment descriptor contains information on one of the segments, including the size and location of the segment. The size and location are also referred to as the segment limit and base address, respectively. In the x86 architecture, the segment limit uses 20 bits of the descriptor. The descriptor also includes a granularity bit which, if set, scales the limit field by a factor of 4096 ($2^{12}$). The base address uses 32 bits of the descriptor. The remaining bits of the descriptor comprise an S-bit (which identifies the segment as a code/data segment or a system segment), a D-bit/B-bit (which indicates the default length for operands and addresses in code/data segments), a type field, a descriptor-privilege-level bit and a segment-present bit.

A particular segment can be accessed by loading the appropriate segment selector into one of the six segment registers available in the x86 architecture. These registers store segment selectors for a code segment (CS), a stack segment (SS) and up to four data segments (DS, ES, FS, GS). While an application can have more than six segments, only six can occupy the segment registers, so only those six are ready for immediate use at any given time. The segment selector includes two bits which indicate the privilege level associated with the segment, a bit which indicates whether the segment descriptor is in the GDT or the LDT, and a 13-bit index into the respective descriptor table.

Occasionally, it may be necessary or useful for a programmer to determine the default execution mode of the current code segment. That is, the programmer may need to determine whether the default size of operands and instructions in the code segment is 16 bits or 32 bits. A programmer who is writing library routines for use by both 16-bit and 32-bit programs, for example, may need to incorporate code to determine the default operating mode. Determining the default operating mode is accomplished by accessing the D-bit/B-bit in the segment descriptor. As pointed out above, the D-bit/B-bit in a segment descriptor indicates the default length for operands and addresses in corresponding code/data segments In the prior art, the D-bit/B-bit could be accessed using the following code sequence:

| (1)  | XOR EDX, EDX       |
|------|--------------------|
| (2)  | MOV DX, CS         |
| (3)  | AND DX, 0f8h       |
| (4)  | SGDT gdt_loc       |
| (5)  | MOV EAX, gdt_loc   |
| (6)  | MOV EBX, EAX+2     |
| (7)  | ADD EBX, EDX       |
| (8)  | MOV EAX, [EDX+4]   |
| (9)  | TEST EAX, 04000000h |
| (10) | JNZ @32BIT         |

This code sequence is illustrative of the numerous steps which must be taken simply to access the code segment's D-bit/B-bit. The code sequence represents the steps of:

(1) XORing the 32-bit EDX register with itself to zero each bit in the register;

(2) moving the 16-bit segment selector for the code segment into the DX register (which forms the lower 16 bits of EDX);

(3) zeroing the lower 3 bits of DX by ANDing the segment selector value with f8 (because the last three bits are used to indicate the privilege level and descriptor table, while the upper 13 bits form an index into the table);

(4) placing the address of the GDT in the variable gdt_loc (the SGDT instruction is protected and can only be executed by the operating system);

(5) placing the address of the GDT in register EAX (this must be done separately from the previous step because the GDT address can only be retrieved through the SGDT instruction);

(6) placing in register EBX the location of the base address of the first entry in the GDT;

(7) adding to EBX the index portion (scaled by 8) of the code segment selector (i.e., placing in EBX the location of the base address of the code segment entry in the GDT);

(8) moving into register EAX the upper 32 bits of the code segment descriptor;

(9) testing the $22^{nd}$ bit of the value in EAX (the D-bit/B-bit) to determine whether or not it is set,

(10) if the D-bit/B-bit is set, jumping to the label @32BIT.

This method of determining the default operating mode is direct in that it determines the mode from the bit which defines the mode. The method has several drawbacks, however. For example, the user application must be operating in Protected Mode (in which the full 32-bit architecture of the computer system is available to the user.) The method is also relatively time-consuming in that it requires ten instructions simply to determine the state of a single bit in the descriptor.

SUMMARY OF THE INVENTION

One or more of the problems outlined above may be solved by the method of the invention. This method determines the default operating mode of the code segment based on the variation of the results which are obtained upon execution of an instruction in each of the two operating modes.

An instruction which modifies one of the x86 registers is selected. The instruction has a corresponding opcode which is valid for execution in both the 32-bit mode and the 16-bit mode. In the 32-bit mode, the instruction causes the 32-bit value in the register to be modified. In the 16-bit mode, the instruction causes the value in the register to be modified, but the modification is contained within the lower 16 bits of the 32-bit register—the lower 16 bits correspond to the 16-bit version of the register. The upper 16 bits of the 32-bit register remain unchanged by the instruction. The operands for the instruction are selected so that, if the instruction is executed in the 32-bit mode, the upper 16 bits of the 32-bit register will be altered by the instruction. After the instruction is executed, the 32-bit value contained in the register is examined to determine whether the upper 16 bits were altered by the instruction. If the upper 16 bits were modified, the default mode of the code segment is 32-bit. If the upper 16 bits were not modified, the default mode of the code segment is 16-bit.

In one embodiment, a general register such as the EAX register is zeroed (i.e., each of the bits is set to 0.) A move instruction specifying an immediate operand to be stored in the register is then executed. (The operand is one which does not have all 0's in the upper 16 bits.) The 32-bit operand is then compared to the 32-bit value in the register and, if they are the same, the instruction is known to have executed in 32-bit mode. Otherwise, the instruction is known to have executed in a 16-bit mode.

The inventive method requires less instructions than the prior art code sequence above and, accordingly, should execute in less time. The inventive method does not use protected instructions such as the SGDT instruction and can consequently be used in applications executing at all privilege levels. The method may also be used in modes other than protected mode.

BRIEF DESCRIPTION OF THE DRAWINGS

Other objects and advantages of the invention will become apparent upon reading the following detailed description and upon reference to the accompanying drawings in which.

Figure 1:
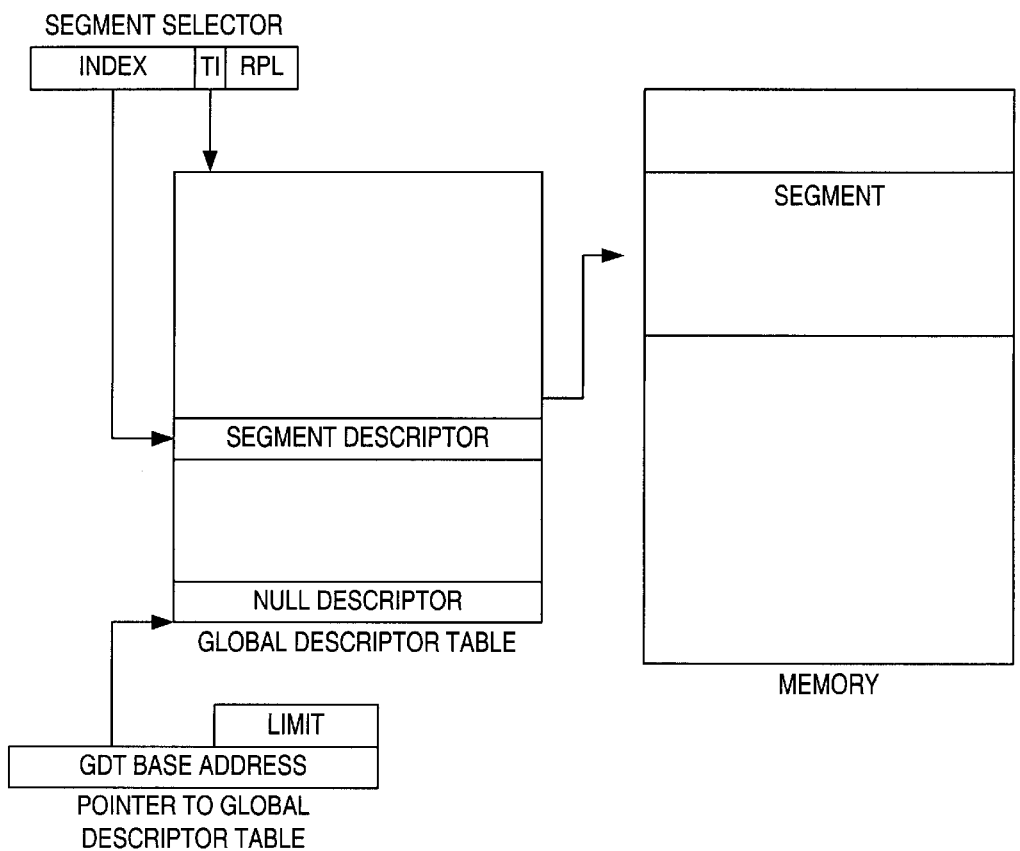
FIG. 1 is a block diagram of a typical memory management model for a system having an x86 architecture.
Figure 2:
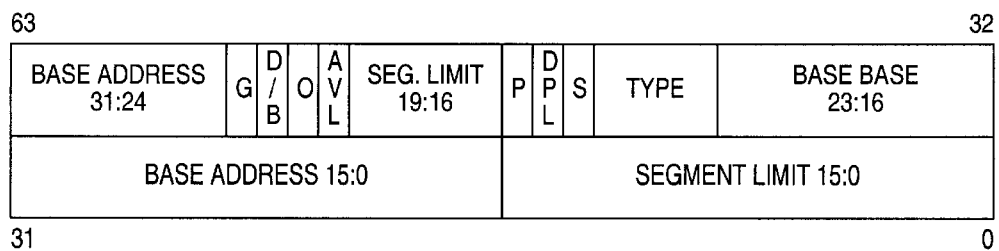
FIG. 2 is a diagram illustrating the components of a segment descriptor in an x86 architecture.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the inventive method is described in detail below. The method is used to determine the default operating mode of the current code segment. The default operating mode determines the default size of instructions and operands in the code segment. The method makes use of instructions which are available to all privilege levels (i.e., rings 0–3) and which can be executed in modes other than the protected mode.

An instruction is selected and executed to perform an operation on one of the 32-bit general registers. The selected instruction is one that has an opcode representation which is identical in both the 16-bit default operating mode and the 32-bit default operating mode. In the 16-bit default operating mode, the instruction can modify only the lower 16 bits of the register. In the 32-bit default operating mode, the instruction can modify both the upper 16 bits and the lower 16 bits.

The register is first set to a known state. An operand is selected for the instruction such that the execution of the instruction in the 32-bit operating mode will modify one or more of the upper 16 bits in the register. The instruction is executed and the register is subsequently examined to determine whether the upper 16 bits of the register have been modified. If these bits have been modified, the default operating mode is 32-bit. If the upper 16 bits have not been modified, the default operating mode is 16-bit.

In one embodiment, the method is implemented using a move instruction to modify the contents of a selected register. The instruction will move a specified immediate value into the register. The register will first be loaded with zeros by performing an exclusive OR (XOR) operation on the selected register. The move instruction will then be executed and the full 32-bit contents of the register will be compared to the 32-bit immediate operand value. A match indicates that the default operating mode is 32-bit.

This embodiment utilizes the following instructions:

| | |
|---|---|
| XOR | eax, eax |
| DB | 0B8h |
| DD | 90909090h |
| CMP | eax, 90909090h |
| JE | @32BIT |

Figure 3:
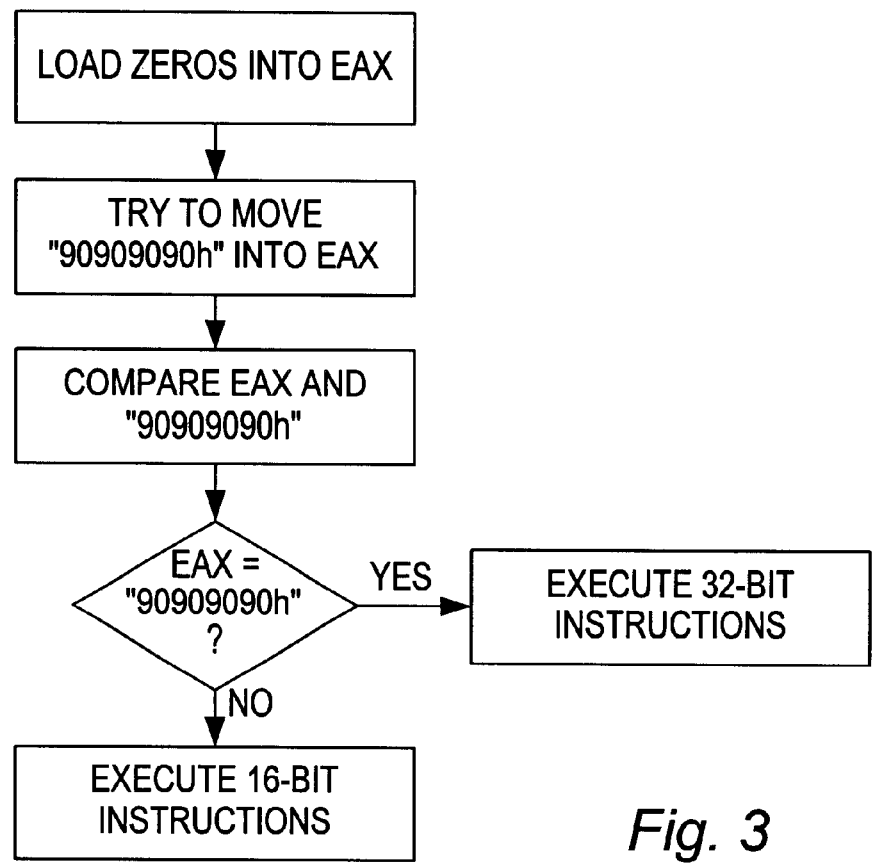
FIG. 3 is a flow diagram illustrating the steps of one embodiment of the invention.

The operation of these instructions is illustrated in FIG. 3. Referring to the figure, the method includes the steps of: zeroing the EAX register; attempting to move the value 90909090h into the EAX register; comparing the contents of the register to 90909090h; and executing instructions for 32-bit mode if the register contains 90909090h. If the register does not contain 90909090h, instructions for 16-bit mode are executed.

The "DB 0B8h" and "DD 90909090h" lines, respectively, actually comprise the first and second halves of the move instruction. (These two lines are therefore collectively referred to herein as a move instruction.) "DB" indicates that the following data byte ("B8") should be entered in the instruction sequence. B8 is the one-byte hexadecimal opcode for a move instruction that stores an immediate value in the EAX or AX register. (If the default mode is 32-bit, the B8 opcode is recognized as a move to 32-bit register EAX; if the default mode is 16-bit, the opcode is recognized as a move to 16-bit register AX.) The line "DB 0B8h" in the program code therefore places the opcode B8 in the instruction sequence.

This opcode, however, requires an immediate value which is to be placed in the register, so the immediate value is inserted in the instruction sequence via the line "DD 90909090h". "DD" indicates that the following data doubleword ("90909090h") should be entered in the instruction sequence. This line thus places the four-byte (doubleword) value 90909090 (hexadecimal) in the instruction sequence.

Together, these two lines in the program code cause the five-byte sequence B8 90 90 90 90 to be placed in the instruction sequence. Depending on the default operating mode, these bytes will be interpreted in one of two ways. If the default mode is 32-bit, the sequence will be interpreted as a 32-bit immediate move to EAX followed by the immediate value 90909090. If the default mode is 16-bit, the sequence will be interpreted as a 16-bit immediate move to AX, followed by the immediate value 9090. The two bytes "9090" will then be treated as subsequent instructions. More specifically, they will be treated as two no-ops (each having the one-byte opcode 90). The immediate value 90909090 was selected for this implementation of the method because the portion of the value which is not used as the operand for the move instruction (the no-ops) can be executed without having any effect on the results of the move or the operation of the microprocessor.

Figure 4:
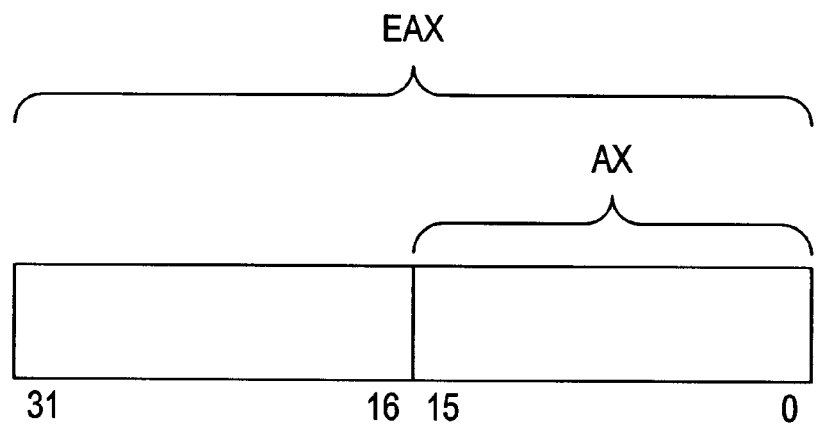
FIG. 4 is a diagram illustrating the relationship of 16-bit register AX to 32-bit register EAX.

As mentioned above, the method does not attempt to directly access the D-bit/B-bit which defines the default operating mode. Instead, it takes advantage of the fact that the move instruction achieves a different result in the 16-bit mode than it does in the 32-bit mode. In the 32-bit mode, the move instruction places the 32-bit value 90909090 (hexadecimal) into the EAX register. In the 16-bit mode, only the first 16 bits of the 32-bit immediate value are used, so the instructions move the 16-bit value 9090h into the AX register. As shown in FIG. 4, which illustrates the structure of register EAX, register AX forms the low-order 16 bits of EAX. Therefore, in 16-bit mode, 9090h is moved into the low-order 16 bits of EAX, while the high-order 16 bits of EAX are left unchanged. Thus, when the contents of EAX are compared to the immediate operand 90909090h, it can be determined whether the entire 32-bit value, or simply half of the value (16 bits), was moved into the register.

The method may utilize various instructions other than those described above. For example, the XOR instruction may be replaced with a move, an AND, or any other instruction or series of instructions which set the register to a known value. Likewise, the move instruction can be replaced with a move to a different register (in which case the preceding instructions would be chosen to manipulate the same register) or any other instruction which has the same opcode in both default modes, but only operates on half of the register in one of the modes. Further, although the embodiment described above is implemented in an x86 architecture, it is contemplated that the teachings of this disclosure can be extended to other architectures.

This method uses non-privileged instructions. ("Non-privileged" as used here means the instructions can be executed at any privilege level.) Because the present method does not use the SGDT instruction or other protected instructions, it can be implemented in software which does not execute in privilege level 0 (also known as ring-0 or kernel mode).

The method described above can also be used in modes other than protected mode. The method does not attempt to examine the D-bit/B-bit of the code segment descriptor, and consequently does not require manipulation of the 32-bit GDT location to get the address of the code segment descriptor from which the D-bit/B-bit is read. Because there is no need to manipulate these 32-bit values, the method is not restricted to the protected mode, which uses 32 bits, in order to preserve the 32-bit values. The method is therefore available to be used in real or virtual modes.

The method described above requires only four instructions (remember that the DB and DD assembly code instructions are actually halves of the same move instruction). The method may therefore execute more quickly than methods which use more instructions. As a result, the efficiency of the software which uses the method of this embodiment may be improved over those having more instructions.

The method is implemented via instructions which may be included in various software applications or library routines and may be embodied in magnetic disks or other storage media known in the art.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method for determining a default operating mode of a code segment, the method comprising:

initializing a register comprising a first set of bits, wherein said initializing comprises setting the first set of bits to a first state;

executing a test instruction such that, when the test instruction is executed, the test instruction will set the first set of bits to a second state only if the default operating mode is a first operating mode, wherein the second state is not equal to the first state; and determining whether the first set of bits were set to the second state by said executing the test instruction, wherein if the first set of bits was set to the second state, the default operating mode of the code segment is the first operating mode.

2. The method of claim 1, wherein the test instruction has a same opcode representation in the first operating mode as in a second operating mode.

3. The method of claim 1, wherein the test instruction is a move instruction.

4. The method of claim 3, wherein said executing said move instruction comprises storing a value in the register, wherein a bit size of the value depends on the default operating mode.

5. The method of claim 3, wherein said initializing comprises initializing an EAX register if the default operating mode is the first operating mode and initializing an AX register if the default operating mode is a second operating mode, and wherein said executing the move instruction comprises storing a first immediate value in the EAX register if the default operating mode is the first operating mode and storing a second immediate value in the AX register if the default operating mode is the second operating mode.

6. The method of claim 3, wherein said executing a test instruction comprises executing the move instruction such that, when the move instruction is executed, a first portion of an operand is used by the move instruction only if the default operating mode is the first operating mode and is unused by the move instruction if the default operating mode is any operating mode other than the first operating mode, wherein the first portion of the operand comprises one or more no-op opcodes.

7. The method of claim 3, wherein an operand for the move instruction comprises an immediate value.

8. The method of claim 1, wherein said initializing, executing and determining is performed by a microprocessor having an x86 architecture.

9. The method of claim 1, wherein the first operating mode is a 32-bit mode and a second operating mode is a 16-bit mode.

10. The method of claim 1, wherein said initializing comprises loading a first value into the register.

11. The method of claim 1, wherein said initializing comprises zeroing the register.

12. The method of claim 1, wherein said executing comprises executing the test instruction in a privilege level other than a privilege level zero.

13. The method of claim 1, wherein said executing comprises executing the test instruction in a mode other than a protected mode.

14. The method of claim 1, wherein the first set of bits comprises a set of higher-order bits.

15. A computer readable medium comprising program instructions executable to:

initialize a register to a first value, wherein the register and the first value each have a first number of bits, wherein the first value comprises a first set of bits, and wherein the register comprises a first portion configured to store a set of bits;

move a second value into the register, wherein the second value has the first number of bits and comprises a second set of bits, and wherein the second set of bits is not equal to the first set of bits; and compare the set of bits stored in the first portion of the register to the second set of bits, wherein a default operating mode of a code segment is a first operating mode if the set of bits stored in the first portion of the register equals the second set of bits and is not the first operating mode if the set of bits stored in the first portion of the register does not equal the second set of bits.

16. The computer readable medium of claim 15, wherein the default operating mode is a second operating mode if the set of bits stored in the first portion of the register does not equal the second set of bits.

17. The computer readable medium of claim 16, wherein the program instructions are further executable to branch to a first instruction address if the default operating mode of the code segment is the first operating mode and to branch to a second instruction address if the default operating mode of the code segment is the second operating mode.

18. The computer readable medium of claim 16, wherein the first set of bits comprises a first set of high-order bits.

19. A method implemented in a microprocessor, the method comprising:

setting a register to a first value, wherein the register and the first value each have a first number of bits, wherein the first value comprises a first set of bits, wherein the register comprises a first portion which is configured to store a set of bits;

moving a second value into the register, wherein the second value has the first number of bits and comprises a second set of bits, wherein the second set of bits is not equal to the first set of bits; and comparing the set of bits stored in the first portion of the register to the second set of bits, wherein a default operating mode of a code segment is a first operating mode if the set of bits stored in the first portion of the register equals the second set of bits and is not the first operating mode if the set of bits stored in the first portion of the register does not equal the second set of bits.

20. The method of claim 19, wherein the first set of bits comprises a first set of high-order bits.

21. The method of claim 19, wherein said determining further comprises determining that the default operating mode is a second operating mode if the set of bits stored in the first portion of the register do not equal the second set of bits.

22. The method of claim 21, further comprising executing additional instructions in the determined default operating mode.

23. The method of claim 19, wherein said setting, moving, and comparing are performed in a real mode.

24. The method of claim 19, wherein said setting, moving, and comparing are performed in a virtual mode.

25. The method of claim 19, wherein said setting, moving, and comparing are performed in a non-zero privilege level.

26. The method of claim 19, wherein the microprocessor has an x86 architecture, and wherein said setting, moving, and comparing are performed by the microprocessor.

* * * * *